US008027931B2

(12) United States Patent
Kalaboukis (10) Patent No.: US 8,027,931 B2
(45) Date of Patent: Sep. 27, 2011

(54) AUTOMATED FRIEND FINDER

(75) Inventor: Chris T. Kalaboukis, Los Gatos, CA (US)

(73) Assignee: Yahoo! Inc., Sunnyvale, CA (US)

( * ) Notice: Subject to any disclaimer, the term of this patent is extended or adjusted under 35 U.S.C. 154(b) by 421 days.

(21) Appl. No.: 12/147,422

(22) Filed: Jun. 26, 2008

(65) Prior Publication Data

US 2009/0326967 A1 Dec. 31, 2009

(51) Int. Cl.
 *G06Q 10/00* (2006.01)
(52) U.S. Cl. ......................................................... 705/319
(58) Field of Classification Search ............... 705/1, 319
 See application file for complete search history.

(56) References Cited

U.S. PATENT DOCUMENTS

| 2002/0052825 A1* | 5/2002 | Bensemana ..................... 705/37 |
| 2008/0097822 A1* | 4/2008 | Schigel et al. .................. 705/10 |
| 2008/0133716 A1* | 6/2008 | Rao et al. ...................... 709/220 |

OTHER PUBLICATIONS

Crazy Blind Date http://www.blinddate.com printed on Jun. 16, 2008 (2 pgs.).
Match.com—Find Singles at the World's Largest Online Dating Personals Service http://www.match.com/home/mymatch.aspx? printed on Jun. 16, 2008 (1 pg.).
Welcome to Facebook! http://www.facebook.com printed on Jun. 16, 2008 (1 pg.).
Google Desktop—Features http://desktop.google.com/features.html printed on Jun. 16, 2008 (2 pgs.).
Six degrees of sales separation http://searchcrm,techtarget.cm/news/article/0,289142,sid11_gci938178,00.html (2 pgs.).
If You Use Outlook E-Mail, Meet Xobni—New York Times http://www.nytimes.com/2008/05/05/technology/05xobni.html?_r=1 &ref=technology&ore... printed on Jun. 16, 2008 (3 pgs.).

* cited by examiner

*Primary Examiner* — Gabrielle McCormick
(74) *Attorney, Agent, or Firm* — Weaver Austin Villeneuve & Sampson LLP (57) ABSTRACT

Disclosed are methods and apparatus for automatically connecting individuals. A private profile of an individual may be automatically generated. The private profile of the individual may be automatically compared with private profiles of a set of individuals such that one or more of the set of individuals are identified as matches for the individual, wherein the private profile of the individual includes private data and each of the private profiles of the set of individuals includes private data. The private profile of the individual is not publicly available to other individuals that have access to a public profile of the individual. The individual may be automatically notified that the individual has been matched with the one or more individuals, thereby enabling the individual to initiate communication with the one or more individuals. The similarities between the private profile of the individual and the private profiles of the one or more individuals are not revealed to the individual or the one or more individuals.

24 Claims, 5 Drawing Sheets

| |
|---|
| Car: Toyota Camry 402 |
| Favorite web pages: Yahoo Finance, eBay, Gap 404 |
| Prior purchases: Corona 406 |
| Group membership: Golden Gate Triathlon club, Weight Watchers 408 |
| Favorite bands: Sheryl Crowe, Nirvana 410 |
| Investments: Yahoo, Cisco 412 |
| |
| |
| |

FIG. 4A

| |
|---|
| Car: Toyota Prius 420 |
| Favorite web pages: Yahoo Finance 422 |
| Prior purchases: Corona, Coors 424 |
| Group membership: Golden Gate Triathlon club, Alcoholics Anonymous 426 |
| Favorite bands: Nirvana, Chris Daughtry 428 |
| Investments: Yahoo, Apple 430 |
| |
| |
| |

AUTOMATED FRIEND FINDER

BACKGROUND OF THE INVENTION

The disclosed embodiments relate generally to methods and apparatus for matching individuals using private data.

Today, there are many ways for individuals to find others with similar interests online. More specifically, numerous web sites exist that enable users to search publicly available information to identify other individuals with the same interests. For instance, web sites such as networking sites and dating sites typically enable a user to create an online public profile, enabling the user to search for and locate other individuals with similar interests among other publicly available profiles.

Unfortunately, public profiles contain only limited information about the individuals who created them. Moreover, the information that individuals present in their public profiles is often deceptive. As a result, the time and energy an individual invests to search these public profiles often yields less than desirable results.

SUMMARY OF THE INVENTION

The disclosed embodiments enable individuals to be connected using private data. In one embodiment, a private profile of an individual is automatically generated. The private profile of the individual is automatically compared with private profiles of a set of individuals such that one or more of the set of individuals are identified as matches for the individual, wherein the private profile of the individual includes private data and each of the private profiles of the set of individuals includes private data. The private profile of the individual is not publicly available to other individuals that have access to a public profile of the individual. The individual may be automatically notified that the individual has been matched with the one or more individuals, thereby enabling the individual to initiate communication with the one or more individuals. The similarities between the private profile of the individual and the private profiles of the one or more individuals are not revealed to the individual or the one or more individuals.

In another embodiment, the invention pertains to a device comprising a processor, memory, and a display. The processor and memory are configured to perform one or more of the above described method operations. In another embodiment, the invention pertains to a computer readable storage medium having computer program instructions stored thereon that are arranged to perform one or more of the above described method operations.

These and other features and advantages of the present invention will be presented in more detail in the following specification of the invention and the accompanying figures which illustrate by way of example the principles of the invention.

DETAILED DESCRIPTION OF THE SPECIFIC EMBODIMENTS

Reference will now be made in detail to specific embodiments of the invention. Examples of these embodiments are illustrated in the accompanying drawings. While the invention will be described in conjunction with these specific embodiments, it will be understood that it is not intended to limit the invention to these embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 1:
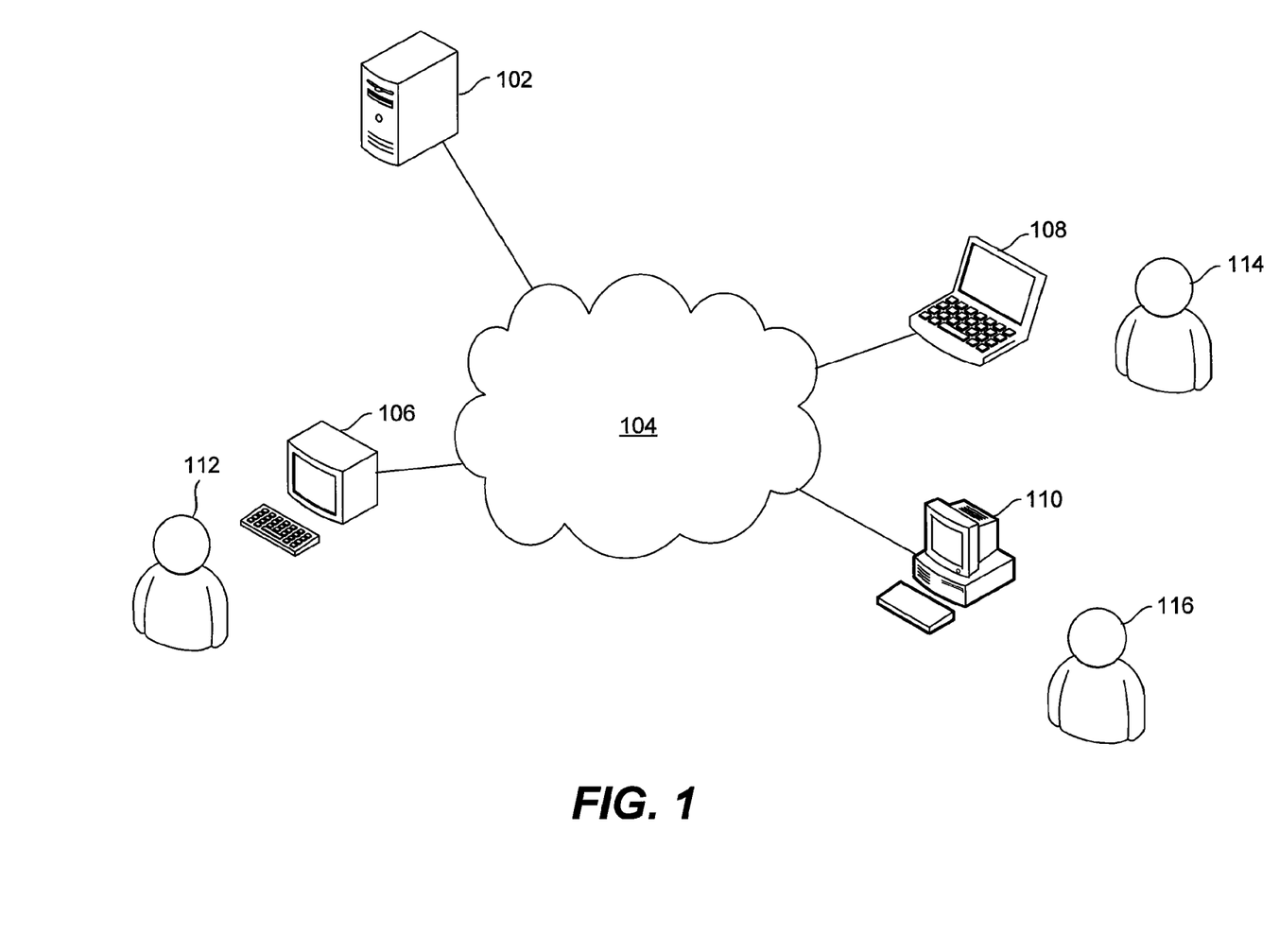
FIG. 1 is a diagram illustrating an example system in which embodiments of the invention may be implemented.

FIG. 1 is a diagram illustrating an example system in which embodiments of the invention may be implemented. As shown in FIG. 1, the system may include one or more servers 102 associated with a web site. Specifically, the server(s) 102 may enable the web site to automatically generate a private profile for various individuals. In this example, the server(s) 102 may obtain or otherwise receive private data via the Internet 104 from one or more computers 106, 108, 110 in association with corresponding individuals 112, 114, 116, respectively.

Since the system accesses private data, the individuals 112, 114, 116 may opt-in to the system in order to enable the system to access their private data. By opting in, the individuals may choose to enable the system to automatically seek out and find other individuals who may be matches with the individuals 112, 114, 116 based upon their respective private profiles.

The private data may be obtained via software that has been downloaded and installed on the computers 106, 108, 110 of the corresponding individuals 112, 114, 116. For example, the software may continuously gather the private data for uploading to the server(s) 102. The software may transmit the private data to the server(s) 102 periodically, or when new private data has been identified. Moreover, the software may continuously update a local profile that includes private data while an individual is not connected to the Internet, and subsequently upload the local profile when the individual reconnects to the Internet. The private data may include or be generated using information gathered from the memory of the computers 106, 108, 110 of the corresponding individuals 112, 114, 116. For instance, this private data may include electronic mail messages, bookmarks, web history, documents, or portions thereof, as well as other information indicating preferences and/or behaviors of the corresponding individual. More specifically, the private data may be organized, summarized, and/or indexed prior to being uploaded to the server(s) 102.

The private data may also be gathered via the web site in accordance with an individual's activity on the web site. For instance, the web site may gather information associated with the individual's web activity such as the web sites visited by the individual, purchases made by the individual, electronic mail messages received via the web site, etc The server(s) 102 may automatically generate and/or update the private profiles for these individuals 112, 114, 116 using this private data. The private profile of any of the individuals 112, 114, 116 may be generated and/or updated at the same or a different time from the other individuals. The server(s) 102 may store these private profiles in a database. Moreover, the private profiles may be encrypted in order to prevent abuse of the private data.

Once private profiles for these individuals 112, 114, 116 have been generated, the system may compare the private profiles in order to match individuals with one another according to similarities between their respective private profiles. Since the individuals are matched using their private profiles, rather than publicly accessible data, these matches are likely to be based upon more accurate data than the data that users enter in public profiles solely in order to attract other friends or dates.

The server(s) 102 may also enable the individuals 112, 114, 116 to generate a public profile. The public profile may be available to the general public, to those that are members of the web site, and/or to a specific category of those members of the web site. In contrast, the private profiles are not publicly available, since they contain private data. In some embodiments, an individual's private profile may be viewed by the individual. For instance, the system may auto-generate the individual's private profile, which the user may then edit. The user may further choose to make this private profile public. However, in other embodiments, an individual may not access his or her private profile.

Figure 2:
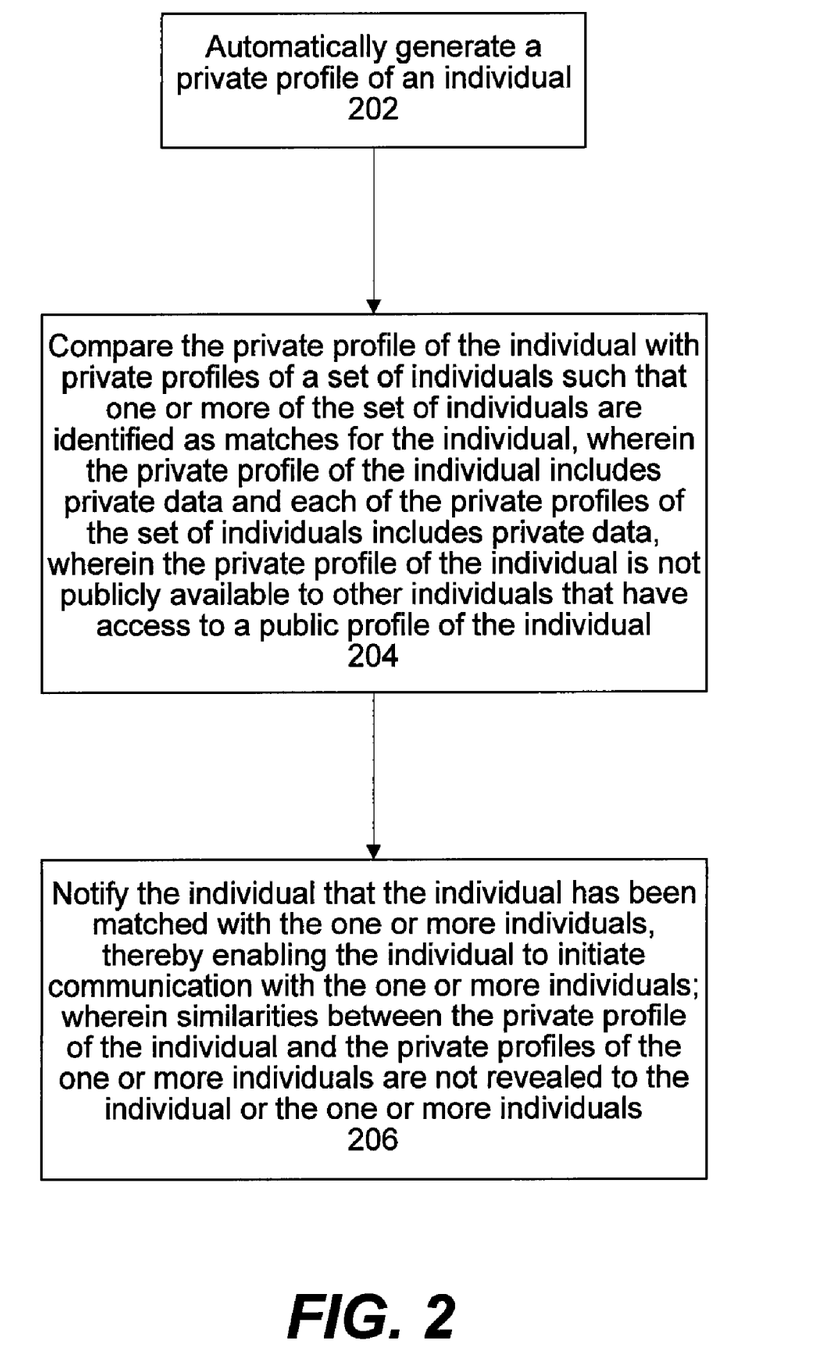
FIG. 2 is a process flow diagram illustrating a method of connecting individuals based upon their private profiles.

FIG. 2 is a process flow diagram illustrating a method of connecting individuals based upon their private profiles. The system may automatically generate a private profile of an individual at 202. For example, the system may automatically obtain and store a set of private data associated with the individual. Moreover, the system may also organize or categorize the set of private data. Where the system maintains a public profile of the individual, the private profile of the individual is not publicly available to other individuals that have access to the public profile of the individual.

The system may compare the private data in the individual's private profile with the public data in the individual's public profile. It is possible that some of the "private data" in the individual's private profile is also present in the individual's public profile. If the system identifies a subset of the private data of the private profile of the individual that is also publicly available in a public profile of the individual, the system may remove the subset of the private data from the private profile. Alternatively, the system may simply flag the subset of the private data as public.

It is also possible that some of the "private data" in the individual's private profile conflicts with public data in the individual's public profile. The system may ascertain whether an inconsistency exists between the private data of the private profile of the individual and public data in a public profile of the individual. The system may flag this inconsistent data in the private profile. In one embodiment, the system may not remove the inconsistent data in the private profile, since the private data is more likely to be accurate than the public data in the public profile.

The system may automatically compare the private profile of the individual with private profiles of a set of individuals at 204 such that one or more of the set of individuals are identified as matches for the individual, wherein the private profile of the individual includes private data and each of the private profiles of the set of individuals includes private data. For example, the system may compare the private data in the private profile of the individual with the private data in the private profiles of the set of individuals. In one embodiment, the system searches the private profiles of the set of individuals to identify a subset of the private data in the private profile of the individual that is identical to a subset of the private data in at least one of the private profiles of the set of individuals. In other embodiments, the system may merely identify a subset of the private data in the private profile of the individual that is similar to or compatible with a subset of the private data in at least one of the private profiles of the set of individuals. The subset of the private data in the private profile of the individual may identify one or more interests of the individual. Similarly, the subset of the private data in the private profiles of the one or more of the set of individuals may identify one or more interests of the one or more individuals. In this manner, an individual may be matched with others who have the same interests, or individuals who have similar and/or compatible interests.

In some embodiments, matches may be generated using both the private profile and the public profile. Where the data in the private profile is inconsistent with the data in the public profile, the system may trust the data in the private profile over the inconsistent data in the public profile.

The system may automatically notify the individual that the individual has been matched with the one or more individuals at 206, thereby enabling the individual to initiate communication with the one or more individuals. For example, the system may notify the individual that there are a specific number of people who have the same interests, and ask the individual whether the individual would like to connect with them. The one or more individuals may similarly be notified that they have been matched with the individual. However, the similarities between the private profile of the individual and the private profiles of the one or more individuals may not be revealed to the individual or the one or more individuals. In other words, the individuals will not be aware of the reason that they have been matched. Rather, the system may provide the individual with public data (e.g., from a public profile) associated with each of the one or more individuals. Similarly, the system may also provide public data (e.g., from a public profile of the individual) to the one or more individuals.

For instance, the information that is revealed may include the sex, age, and/or location (e.g., city) of an individual. In addition, an obscured image of the individual may also be provided. For example, the system may inform the individual that "person A is 29, female, and from San Jose, while person B is 34 and male, and person C is from San Jose." Thus, the identity of the individual may not be revealed to the one or more individuals, and the identity of each of the one or more individuals may not be revealed to the individual. The individuals that have been matched may then decide whether they wish to exchange further contact information.

In accordance with one embodiment, the system may match people who are not interconnected in any way, in order to present matches that are completely disconnected. For example, the system may find a match who is distantly connected to the individual via the individual's social network. However, the system could exclude this match as the individual may not wish to make this connection. In this manner, the disclosed embodiments enable individuals who are not already linked via a social network to be connected.

The system may further manage communications between matched individuals. For instance, the system may enable the individuals to communicate anonymously over the Internet using electronic mail messages or instant messaging, for example. The individuals may communicate anonymously until the individuals agree to release their information to one another. If an individual chooses to add another individual to their friends list, the public profile of the individual may be revealed.

The system may also provide a recommendation to the individual based upon the private data in at least one of the private profiles of the one or more individuals. For example, the system may recommend a product or brand based upon aggregating matching profiles. For example, the system could determine that the individual has an affinity with 100 people. Of those 100 people, 75 of those people like to drink Corona. The individual does not show a preference for any beer, but drinks beer per the individual's private profile. The system could then recommend Corona to the individual based upon this information. Similarly, the system could recommend that the individual join a group or attend an event based upon the matched private profiles.

Figure 3:
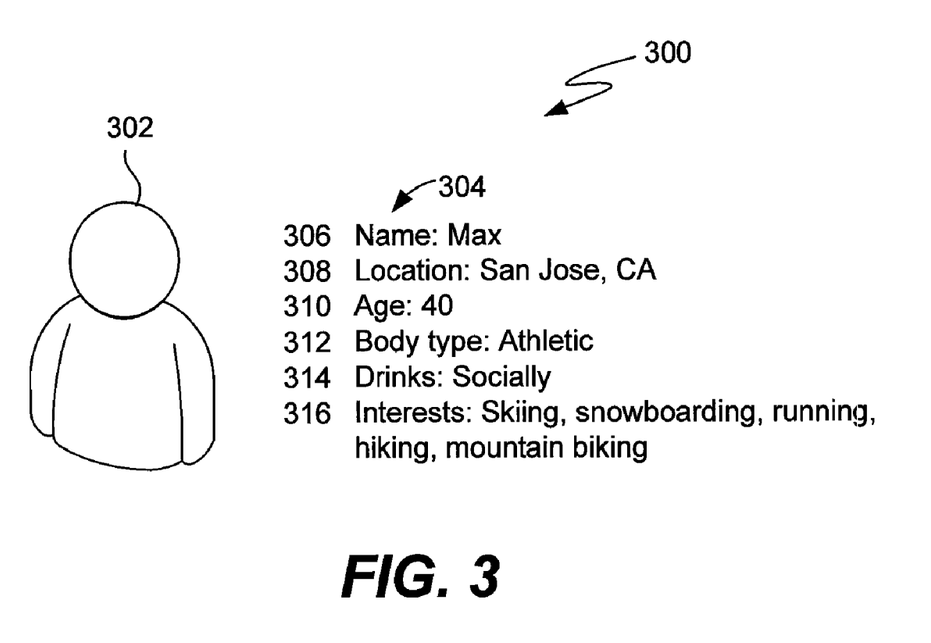
FIG. 3 is a diagram illustrating an example public profile that may be created by a first individual.

FIG. 3 is a diagram illustrating an example public profile 300 that may be created by a first individual. As shown in this example, the public profile 300 may include one or more photographs 302, as well as a textual profile 304. The textual profile 304 may be created by selection of pre-defined answers and/or by entering free-form sentences or information. For instance, the first individual may submit his name 306, location 308, age 310, body type 312, drinking habits 314, and interests 316. In this example, the first individual indicates that his body type 312 is athletic, he drinks socially 314, and that his interests 316 include skiing, snowboarding, running, hiking, and mountain biking.

Figure 4A:
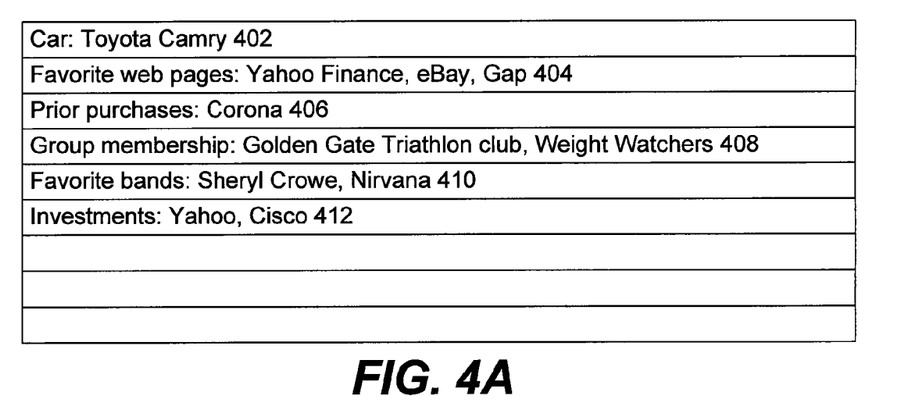
FIGS. 4A is a diagram illustrating an example private profile that may be automatically generated for the first individual in accordance with various embodiments of the invention.

FIGS. 4A is a diagram illustrating an example private profile that may be automatically generated for the first individual in accordance with various embodiments of the invention. The private profile for the first individual shows that the first individual owns a Toyota Camry 402 and his favorite web pages 404 include Yahoo Finance, eBay.com, and Gap.com. The first individual's prior purchases 406 include Corona. The first individual has a group membership 408 with the Golden Gate Triathlon Club and Weight Watchers. Thus, although the first individual's public profile indicates that his body type is athletic, the fact that he is a member of Weight Watchers contradicts this information. As a result, the system may trust the private information over the publicly available information. His favorite bands 410 include Sheryl Crowe and Nirvana, and his investments 412 include Yahoo and Cisco stock.

Figure 4B:
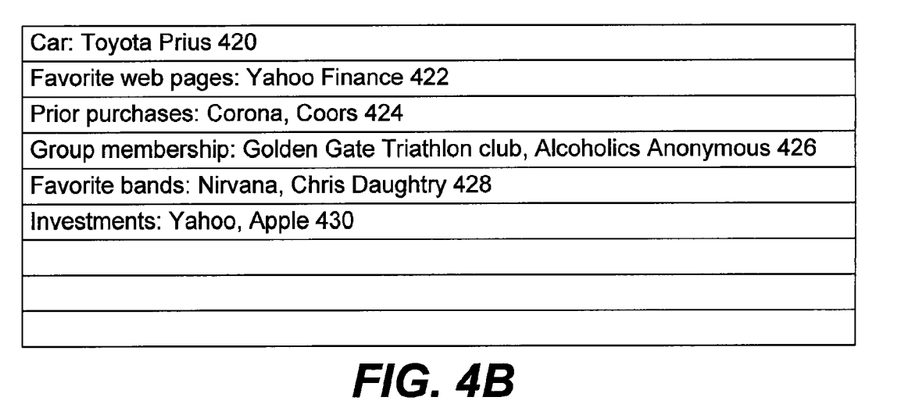
FIG. 4B is a diagram illustrating an example private profile of a second individual whose profile matches the private profile of the first individual.

FIG. 4B is a diagram illustrating an example private profile of a second individual whose profile matches the private profile of the first individual. The private profile for the second individual shows that the second individual owns a Toyota Prius 420 and his favorite web pages 422 include Yahoo Finance. The second individual's prior purchases 424 include Corona and Coors. In addition, the second individual has a group membership 426 with the Golden Gate Triathlon Club and Alcoholics Anonymous. His favorite bands 428 include Nirvana and Chris Daughtry, and his investments 430 include Yahoo and Apple stock.

As shown above with reference to FIGS. 4A and 4B, both the first and second individuals have a number of the same interests. Both individuals own a Toyota, like Yahoo Finance, and own Yahoo stock. In addition, both individuals are members of the Golden Gate Triathlon Club and like Nirvana. The system may provide both individuals minimal public information in order to enable the individuals to decide whether they wish to communicate with one another and/or add that individual to their social network. The system may notify the individuals that they have similar interests. However, the system may not notify the individuals of the specific similarities between their private profiles. As a result, the private data is not revealed.

The system may also make recommendations based upon the matching profile(s). For instance, the system may recommend that the first individual buy Apple stock or recommend Chris Daughtry as a band that the first individual might like. As another example, the system may recommend Coors to the first individual. For instance, the system may notify the individual that "a lot of people like you drink Coors." In addition, due to the similarities between the two private profiles, the system may recommend that the first individual join Alcoholics Anonymous, even though the first individual has not identified himself as an alcoholic. Accordingly, the system may provide more accurate recommendations based upon private data, rather than the facade of a public profile.

The disclosed embodiments enable individuals to find new friends or dates with the same interests without requiring the individuals to enter any data. Moreover, this is accomplished by matching the individuals based upon private profiles assembled from private data. Since most individuals purposely only reveal certain aspects of themselves when completing a public profile, the connections between the individuals will be deeper than matches that are made using public data.

Since the system automatically scans the private data, generates and updates private profiles, and matches the individuals based upon these private profiles, the individuals need not create a profile or enter any data. An individual can merely decide which of the matched individuals they wish to communicate with.

Figure 5:
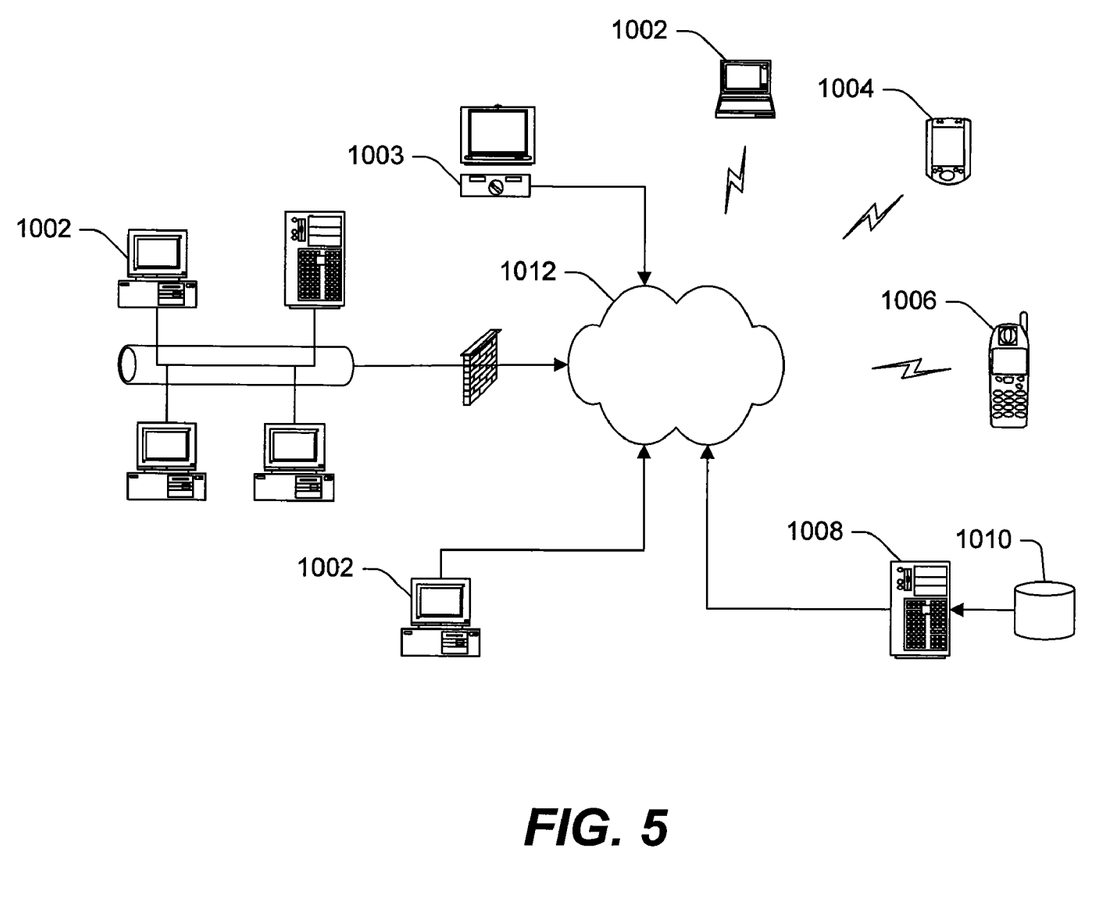
FIG. 5 is a simplified diagram of a network environment in which specific embodiments of the present invention may be implemented.

Embodiments of the present invention may be employed to obtain and process private data to generate matches in any of a wide variety of computing contexts. For example, as illustrated in FIG. 5, implementations are contemplated in which the relevant population of users interact with a diverse network environment via any type of computer (e.g., desktop, laptop, tablet, etc.) 1002, media computing platforms 1003 (e.g., cable and satellite set top boxes and digital video recorders), handheld computing devices (e.g., PDAs) 1004, cell phones 1006, or any other type of computing or communication platform.

And according to various embodiments, input that is processed in accordance with the invention may be obtained using a wide variety of techniques. For example, a public profile or private data may be obtained from a user's interaction with a local application, web site or web-based application or service and may be accomplished using any of a variety of well known mechanisms for obtaining information from a user. However, it should be understood that such methods of obtaining input from a user are merely examples and that a set of user preferences may be collected in many other ways.

Once private data has been obtained, a private profile may be generated and processed to generate matches according to the invention in some centralized manner. This is represented in FIG. 5 by server 1008 and data store 1010 which, as will be understood, may correspond to multiple distributed devices and data stores. The invention may also be practiced in a wide variety of network environments (represented by network 1012) including, for example, TCP/IP-based networks, telecommunications networks, wireless networks, etc. In addition, the computer program instructions with which embodiments of the invention are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

The disclosed techniques of the present invention may be implemented in any suitable combination of software and/or hardware system, such as a web-based server or desktop computer system. The private profile processing apparatus of this invention may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the required method steps.

Regardless of the system's configuration, it may employ one or more memories or memory modules configured to store data, program instructions for the general-purpose processing operations and/or the inventive techniques described herein. The program instructions may control the operation of an operating system and/or one or more applications, for example. The memory or memories may also be configured to store private profiles, public profiles, matches that have been generated, connections among various social networks, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter. Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A method, comprising:
    automatically generating a private profile of an individual;
    identifying a subset of private data of the private profile of the individual that is publicly available in a public profile of the individual;
    removing the subset of the private data from the private profile;
    automatically comparing by a computing device the private profile of the individual with private profiles of a set of individuals such that one or more of the set of individuals are identified as matches for the individual, wherein the private profile of the individual includes private data and each of the private profiles of the set of individuals includes private data, wherein the private profile of the individual is not publicly available to other individuals that have access to the public profile of the individual, the computing device having a processor and a memory; and
    automatically notifying the individual that the individual has been matched with the one or more individuals, thereby enabling the individual to initiate communication with the one or more individuals;
    wherein similarities between the private profile of the individual and the private profiles of the one or more individuals are not revealed to the individual or the one or more individuals.

2. The method as recited in claim 1, wherein automatically notifying the individual that the individual has been matched with the one or more individuals comprises:
    providing the individual with public data from a public profile of each of the one or more individuals without notifying the individual of the similarities between the private profile of the individual and the private profile of each of the one or more individuals.

3. The method as recited in claim 1, wherein the private data in the private profile cannot be accessed by the individual.

4. The method as recited in claim 1, further comprising:
    automatically obtaining a set of private data associated with the individual; and
    automatically storing the set of private data in the private profile.

5. The method as recited in claim 1, wherein automatically comparing the private profile of the individual with private profiles of a set of individuals such that one or more of the set of individuals are identified as matches comprises:
    searching the private profiles of the set of individuals to identify a second subset of the private data in the private profile of the individual that is identical to a subset of the private data in at least one of the private profiles of the set of individuals.

6. The method as recited in claim 5, wherein the second subset of the private data in the private profile of the individual identifies one or more interests of the individual and wherein the subset of the private data in the private profiles of the one or more of the set of individuals identifies one or more interests of the one or more individuals.

7. The method as recited in claim 1, wherein an identity of the individual is not revealed to the one or more individuals, and wherein an identity of each of the one or more individuals is not revealed to the individual.

8. The method as recited in claim 1, wherein the individual is in a social network and the one or more individuals that have been identified as matches are not in the social network.

9. The method as recited in claim 1, further comprising:
    providing a recommendation to the individual based upon the private data in at least one of the private profiles of the one or more individuals.

10. The method as recited in claim 1, further comprising:
    ascertaining whether an inconsistency exists between the private data of the private profile of the individual and public data in a public profile of the individual; and
    flagging the inconsistency between the private data of the private profile of the individual and the public data in the public profile of the individual.

11. The method as recited in claim 1, wherein the similarities indicate a second subset of the private data in the private profile of the individual that is identical to, similar to, or compatible with a subset of the private data in the private profiles of the one or more individuals, wherein comparing the private profile of the individual with private profiles of the sets of individuals comprises:

identifying the similarities between the private profile of the individual and the private profiles of the set of individuals, wherein the similarities include the second subset of the private data in the private profile of the individual that is identical to, similar to, or compatible with a subset of the private data in at least one of the private profiles of the set of individuals.

12. The method as recited in claim 1, wherein the one or more individuals are not automatically notified that they have been matched with the individual.

13. A non-transitory computer-readable medium storing thereon computer-readable instructions, comprising:
   instructions for automatically generating a private profile of an individual;
   instructions for removing data in the private profile of the individual that is in a public profile of the individual;
   instructions for automatically comparing the private profile of the individual with private profiles of a set of individuals such that one or more of the set of individuals are identified as matches for the individual, wherein the private profile of the individual includes private data and each of the private profiles of the set of individuals includes private data, wherein the private profile of the individual is not publicly available to other individuals that have access to the public profile of the individual; and
   instructions for automatically notifying the individual that the individual has been matched with the one or more individuals, thereby enabling the individual to initiate communication with the one or more individuals;
   wherein similarities between the private profile of the individual and the private profiles of the one or more individuals are not revealed to the individual or the one or more individuals.

14. The non-transitory computer-readable medium as recited in claim 13, wherein the private data in the private profile of the individual includes private data identifying one or more products purchased by the individual.

15. The non-transitory computer-readable medium as recited in claim 13, wherein the private data in the private profile of the individual includes private data identifying one or more web sites visited by the individual.

16. The non-transitory computer-readable medium as recited in claim 13, wherein the private data in the private profile of the individual includes private data identifying one or more groups of which the individual is a member.

17. An apparatus, comprising:
   a processor; and
   a memory, at least one of the processor or the memory being adapted for:
   automatically generating a private profile of an individual;
   identifying a subset of private data of the private profile of the individual that is publicly available in a public profile of the individual;
   removing the subset of the private data from the private profile;
   automatically comparing the private profile of the individual with private profiles of a set of individuals such that one or more of the set of individuals are identified as matches for the individual, wherein the private profile of the individual includes private data and each of the private profiles of the set of individuals includes private data, wherein the private profile of the individual is not publicly available to other individuals that have access to a public profile of the individual; and
   automatically notifying the individual that the individual has been matched with the one or more individuals, thereby enabling the individual to initiate communication with the one or more individuals;
   wherein similarities between the private profile of the individual and the private profiles of the one or more individuals are not revealed to the individual or the one or more individuals.

18. The apparatus as recited in claim 17, at least one of the processor or the memory being further adapted for:
   modifying the private profile of the individual in response to input from the individual.

19. The apparatus as recited in claim 17, wherein automatically comparing the private profile of the individual with private profiles of a set of individuals such that one or more of the set of individuals are identified as matches comprises:
   searching the private profiles of the set of individuals to identify a second subset of the private data in the private profile of the individual that is identical to a subset of the private data in at least one of the private profiles of the set of individuals.

20. The apparatus as recited in claim 19, wherein the second subset of the private data in the private profile of the individual identifies one or more interests of the individual and wherein the subset of the private data in the private profiles of the one or more of the set of individuals identifies one or more interests of the one or more individuals.

21. The apparatus as recited in claim 17, at least one of the processor or the memory being further adapted for:
   providing a recommendation to the individual based upon the private data in at least one of the private profiles of the one or more individuals.

22. A method, comprising:
   identifying a subset of private data of a private profile of an individual that is publicly available in a public profile of the individual;
   removing the subset of the private data from the private profile;
   automatically comparing by a computing device information in both the private profile and the public profile of the individual with information in both private profiles and public profiles of a set of individuals such that one or more of the set of individuals are identified as matches for the individual, wherein the private profile of the individual includes private data and each of the private profiles of the set of individuals includes private data, wherein the private profile of the individual is not publicly available to other individuals that have access to the public profile of the individual, the computing device including a processor and a memory; and
   automatically notifying the individual that the individual has been matched with the one or more individuals, thereby enabling the individual to initiate communication with the one or more individuals;
   wherein similarities between a first set of information in 1) both the private profile and public profile of the individual and a second set of information in 2) both the private profiles and the public profiles of the one or more individuals are not revealed to the individual or the one or more individuals.

23. The method as recited in claim 22, further comprising:
   ascertaining whether an inconsistency exists between the private data of the private profile of the individual and public data in the public profile of the individual;
   when it is ascertained that an inconsistency exists between a portion of the private data of the private profile of the individual and a portion of the public data in the public profile of the individual, the portion of the private data is trusted over the portion of the public data during identification of the matches.

24. An apparatus, comprising:
a processor; and
a memory, at least one of the processor or the memory being adapted for:
identifying a subset of private data of a private profile of an individual that is publicly available in a public profile of the individual;
removing the subset of the private data from the private profile;
automatically comparing by a computing device information in both the private profile and the public profile of the individual with information in both private profiles and public profiles of a set of individuals such that one or more of the set of individuals are identified as matches for the individual, wherein the private profile of the individual includes private data and each of the private profiles of the set of individuals includes private data, wherein the private profile of the individual is not publicly available to other individuals that have access to the public profile of the individual, the computing device including a processor and a memory; and
automatically notifying the individual that the individual has been matched with the one or more individuals, thereby enabling the individual to initiate communication with the one or more individuals;
wherein similarities between information in 1) both the private profile and public profile of the individual and information in 2) both the private profiles and the public profiles of the one or more individuals are not revealed to the individual or the one or more individuals.

* * * * *